Patented May 4, 1948

2,441,101

UNITED STATES PATENT OFFICE 2,441,101

MARKING INK

Irving C. Matthews and Glenn M. Atkins, Rochester, N. Y., assignors to Eastman Kodak Company, Rochester, N. Y., a corporation of New Jersey No Drawing. Application April 24, 1945, Serial No. 590,122

1 Claim. (Cl. 260—6)

This invention relates to inks, and more particularly to inks for marking or lettering on a variety of surfaces.

As is well known, many difficulties are encountered with the inks now in use for writing or lettering on surfaces other than writing paper. One has only to think of the white inks commonly in use for lettering on black paper or on book bindings, or of the difficulty of making satisfactory markings on glass, porcelain, or metals, to realize the existence of this problem. Some of the difficulties met with in such inks are the following: poor adhesion; low resistance to abrasion; high evaporation rate of the vehicle, leaving the pigments or fillers in a powdery state and hence useless; corrosive effect of acid inks on pens or other metal surfaces to which they are applied; poor resistance to temperature and humidity changes, dry heat, etc.; poor flowing properties with pens, brushes, etc., and in many cases, inability to wet the surfaces of many materials.

One object of our invention is to provide an ink which will make smooth, permanent marks on a great variety of surfaces, such as hard or soft woods, ferrous and non-ferrous metals, electroplated metals, plastics, highly polished plate and other glasses, leather, rubber, artificial leather, photographic film and negatives on either side, paper, including coated photographic paper, all types of book bindings, painted, japanned and lacquered surfaces, and textile surfaces. It will be noted that many of these surfaces are non-porous.

We have invented an ink which has exceptionally good adherence to all these surfaces. When it is applied by means of a writing or drawing pen, small camel's-hair brush, small spray gun, etc., it dries in from 2 to 3 minutes, and the figures or letters can be rubbed in 5 minutes without blurring them. In 30 minutes the markings can be scraped with the finger nail without removing them. The markings resist acids and weak alkalies and many solvents. Their water resistance can be increased by heat treatment at 130° F. Our ink can also be used with very successful results as a filler for the marks in engraved photographic lens mounts, engraved thermometers, instrument dials, parts of typewriters and adding machines, etched plates, and the like.

Our novel ink contains the following ingredients, in the approximate proportions indicated:

|   | Parts by weight |
|---|---|
| Pigment | 15–35 |
| Casein | 5–10 |
| Casein preservative | Small amount |
| Water | 35–55 |
| Resin | 2–25 |
| Wetting agent | 2–10 |
| Defoaming compound | 0.1–2.0 |
| Antioxidant and rust preventive | 0.1–1.0 |
| Low-boiling organic solvent | 5–15 |
| Medium-boiling organic solvent | 5–15 |
| Pigment-dispersing agent (optional) | 1–3 |

The pigment may be a white pigment, e. g., a titanium-calcium pigment or other titanium pigment or magnesium oxide, or it may be a colored pigment or lake of any desired color, or a dye may be used. Any of the many known casein preservatives may be used, for example, ammonium fluoride, ammonium salicylate, or borax and ammonium hydroxide. White pigment, casein, and casein preservative may conveniently be introduced in the form of a commercial "casein paste." If this is used, part of the water will be provided by the casein paste.

The resin may be one of the resins described in U. S. Patent 2,022,149, prepared from terpinene, maleic anhydride, glycerol and a fatty acid. This resin may conveniently be introduced in the form of a 50–75% solution in toluene. Among other types of resins which may be used are phenol-formaldehyde resins, and methacrylate resins, e. g., a 25% emulsion of methyl methacrylate in water. A plasticizer for the resin may be added if desired.

The most varied types of wetting agent may be used, e. g., morpholine, or a sulfonated hydrocarbon, or sodium stearate.

Tributyl phosphate is a suitable defoaming agent, but other known defoaming agents may be used.

A suitable anti-oxidant and rust preventive is sodium tartrate, but other known antioxidants and rust preventives may be used.

Suitable low-boiling solvents include, for example, acetone, denatured alcohol, ethyl acetate, and methyl acetate. Suitable medium-boiling solvents include, for example, amyl acetate and pine oil.

In addition to a wetting agent, a pigment-dispersing agent, such as 10–20 parts of a 10–15% gum arabic solution, may be added.

The various components of our novel ink may be mixed together in any convenient mill or homogenizer.

As a specific embodiment of our invention, we give the following example of a white ink.

*Example*

| | Grams |
|---|---|
| Casein paste (containing approximately 14% casein and 52% titanium-calcium pigment, with water and a small amount of preservative) | 30–60 |
| Water | 25–35 |
| Terpinene - maleic anhydride - glycerol-fatty acid resin (50–75% solids in toluene) | 5–15 |
| Sulfonated hydrocarbon wetting agent | 2–6 |
| Tributyl phospate | 0.3–1.5 |
| Sodium tartrate | 0.1–0.5 |
| Acetone | 8–14 |
| Amy acetate | 6–12 |

The pH value of this product is approximately 7, so that it does not corrode metals.

In the appended claim, all amounts are expressed in parts by weight.

What we claim as our invention and desire to be secured by Letters Patent of the United States is:

An ink for marking on various types of surfaces, including non-porous surfaces, which comprises: 15–32 parts of a white titanium pigment, 4–9 parts of casein, 35–55 parts of water, a small amount of a casein preservative, 2.5–12 parts of a terpinene-maleic anhydride-glycerol-fatty acid resin, 2–6 parts of a wetting agent, 0.3–1.5 parts of tributyl phosphate, 0.1–0.5 parts of sodium tartrate, 8–14 parts of acetone, and 6–12 parts of amyl acetate.

IRVING C. MATTHEWS.
GLENN M. ATKINS.

REFERENCES CITED

The following references are of record in the file of this patent:

UNITED STATES PATENTS

| Number | Name | Date |
|---|---|---|
| 1,915,148 | Berliner | June 20, 1933 |
| 2,008,018 | Hemming | July 16, 1935 |
| 2,230,230 | Boggs | Feb. 4, 1941 |
| 2,351,309 | White | June 13, 1944 |

OTHER REFERENCES

Sutermeister et al., Casein and Its Industrial Applications, Reinhold, 1939, page 344.

Hercules Powder Co., Lacquer Emulsions, 1935, pages 3, 4, 11 and 12.